United States Patent
Gaal et al.

(10) Patent No.: US 8,619,544 B2
(45) Date of Patent: Dec. 31, 2013

(54) APPARATUS AND METHOD FOR FACILITATING TRANSMIT DIVERSITY FOR COMMUNICATIONS

(75) Inventors: Peter Gaal, San Diego, CA (US); Juan Montojo, San Diego, CA (US); Xiliang Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 12/564,827

(22) Filed: Sep. 22, 2009

(65) Prior Publication Data

US 2010/0074210 A1  Mar. 25, 2010

Related U.S. Application Data

(60) Provisional application No. 61/099,368, filed on Sep. 23, 2008.

(51) Int. Cl.
*H04W 72/04* (2009.01)
*H04J 11/00* (2006.01)
*H04B 7/216* (2006.01)
*H04B 7/02* (2006.01)

(52) U.S. Cl.
USPC ........... 370/209; 370/329; 370/334; 370/335; 370/342; 370/479; 455/450; 375/267; 375/299

(58) Field of Classification Search
USPC ......... 370/203, 208, 328, 329, 330, 342–343; 375/267; 455/450
See application file for complete search history.

(56) References Cited

U.S. PATENT DOCUMENTS

| 6,590,889 | B1 * | 7/2003 | Preuss et al. | 370/342 |
|---|---|---|---|---|
| 7,065,156 | B1 * | 6/2006 | Kuchi | 375/299 |
| 7,145,886 | B1 | 12/2006 | Kitade et al. | |
| 8,059,735 | B2 * | 11/2011 | Shen et al. | 375/260 |
| 8,130,630 | B2 * | 3/2012 | Ahn et al. | 370/208 |
| 8,149,780 | B2 * | 4/2012 | Popovic et al. | 370/330 |
| 8,160,018 | B2 * | 4/2012 | Zhang et al. | 370/330 |

(Continued)

FOREIGN PATENT DOCUMENTS

| JP | 2001223638 A | 8/2001 |
|---|---|---|
| RU | 20060143208 | 6/2008 |

(Continued)

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.

(Continued)

*Primary Examiner* — Candal Elpenord
(74) *Attorney, Agent, or Firm* — Liem T. Do

(57) ABSTRACT

A method and apparatus facilitating transmit diversity for control information communications is provided. The method may comprise processing received content, generating control information in response to the processed content, allocating two or more resources associated with two or more transmit antennas for transmitting the control information using a transmit diversity scheme, and determining cyclic shifts by applying a predetermined cyclic shift delta parameter.

23 Claims, 7 Drawing Sheets

(56) References Cited

U.S. PATENT DOCUMENTS

| | | | |
|---|---|---|---|
| 8,238,320 B2* | 8/2012 | Kim et al. | 370/344 |
| 8,312,335 B2* | 11/2012 | Lee et al. | 714/748 |
| 8,396,152 B2* | 3/2013 | Attar et al. | 375/267 |
| 8,427,936 B2* | 4/2013 | Walton et al. | 370/209 |
| 2003/0185171 A1 | 10/2003 | Mullins et al. | |
| 2007/0258540 A1* | 11/2007 | Ratasuk et al. | 375/267 |
| 2008/0316957 A1* | 12/2008 | Shen et al. | 370/328 |
| 2009/0046646 A1* | 2/2009 | Cho et al. | 370/329 |
| 2009/0103482 A1* | 4/2009 | Imamura et al. | 370/329 |
| 2009/0303978 A1* | 12/2009 | Pajukoski et al. | 370/345 |

FOREIGN PATENT DOCUMENTS

| | | |
|---|---|---|
| WO | 2005114939 | 12/2005 |
| WO | 2006130742 A1 | 12/2006 |
| WO | WO2009147133 A2 | 12/2009 |

OTHER PUBLICATIONS

"3rd Generation Partnership Project; Technical Specification Group Radio Access Network; Evolved Universal Terrestrial Radio Access (E-UTRA); Multiplexing and channel coding (Release 8)" 3GPP Standard; 3GPP TS 36.212, 3rd Generation Partnership Project (3GPP), Mobile Competence Centre; 650, Route Des Lucioles; F-06921 Sophia-Antipolis Cedex France, No. V8.3.0, May 1, 2008, pp. 1-48, XP050377549, p. 33.

"3rd Generation Partnership Project; Technical Specification Group Radio Access Network; Evolved Universal Terrestrial Radio Access (E-UTRA); Physical layer procedures (Release 8)" 3GPP Standard; 3GPP TS 36.213, 3rd Generation Partnership Project (3GPP), Mobile Competence Centre; 650, Route Des Lucioles; F-06921 Sophia-Antipolis Cedex; France, No. V8.3.0, May 1, 2008, pp. 1-47, XP050377558.

International Search Report & Written Opinion—PCT/US2010/058109- International Search Authroity—European Patent Office—May 19, 2010.

Motorola: "Multiple ACK/NACK Transmission for TDD" 3GPP Draft; RI-083230, 3rd Generation Partnership Project (3GPP), Mobile Competence Centre; 650, Route Des Lucioles; F-06921 Sophia-Antipolis Cedex; France, No. Jeju; 20080813, Aug. 13, 2008, XP050316644 [retrieved on Aug. 13, 2008].

Nortel: "Transmit diversity for Pucch in LTE-A" 3GPP Draft; R1-083159(N0rtel Transmit Diversity for Pucch in LTE-A), 3rd Generation Partnership Project (36PP), Mobile Competence Centre; 650, Route Des Lucioles; F-06921 Sophia-Antipolis Cedex; France, No. Jeju; 20080812, Aug. 12, 2008, XP050316594 [retrieved on Aug. 12, 2008].

TSG RAN: "3GPP TS36.211 V8.3.0 Evolved Universal Terrestrial Radio Access (E-UTRA); Physical Channels and Modulation (Release 8)" Jun. 18, 2008, pp. 1-77, XP002565805 Retrieved from the Internet: URL:http://www.3gpp.org> [retrieved on Nov. 3, 2009].

ZTE: "Implicit Mapping of ACK/NACK Resources" 3GPP Draft; RI-081418 Implicit Mapping of ACK/NACK Resources, 3rd Generation Partnership Project (3GPP), Mobile Competence Centre; 650, Route Des Lucioles; F-06921 Sophia-Antipolis Cedex; France, vol. RAN WGI, no. Shenzhen, China; 20080326, Mar. 26, 2008, XP050109835 [retrieved on Mar. 26, 2008].

NTT Docomo, Ericsson, KDDI, Mitsubishi Electric, NEC, Sharp: "Performance Enhancement Techniques for ACK/NACK in E-UTRA Uplink", 3GPP TSG RAN WG1 Meeting #48, R1-070863, Feb. 12, 2007.

NTT Docomo, Inc., "Views on UL MIMO Schemes in LTE-Advanced", 3GPP TSG RAN WG1 Meeting #54, R1-083017, Aug. 18, 2008.

Taiwan Search Report—TW098132182—TIPO—Jan. 10, 2013.

NTT DoCoMo, "Implicit Resource Allocation of ACK/NACK Signal in E-UTRA Uplink," R1-072439, 3GPP TSG RAN WG1 Meeting #49, Kobe, Japan, May 7-11, 2007, 3 pages.

Panasonic, "Usage of Cyclic Shifts and Block-wise spreading codes for Uplink ACK/NACK," R1-072799, 3GPP TSG RAN WG1 Meeting #49bis, Orlando, USA, Jun. 25-29, 2007, 2 pages.

* cited by examiner

APPARATUS AND METHOD FOR FACILITATING TRANSMIT DIVERSITY FOR COMMUNICATIONS

CLAIM OF PRIORITY UNDER 35 U.S.C. §119

The present application for patent claims priority to Provisional Application No. 61/099,368 entitled "TRANSMIT DIVERSITY FOR UPLINK WIRELESS CHANNELS" filed Sep. 23, 2008, and assigned to the assignee hereof and hereby expressly incorporated by reference herein.

BACKGROUND

1. Field

The present application relates generally to wireless communications, and more specifically to methods and systems for facilitating transmit diversity for communications.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Transmit diversity schemes may be used for enhancing communication reliability in a wireless multiple-access communication system. One problem with transmit diversity is interference among transmitters that transmit on common resources. For example, in a third generation partnership project (3GPP) long term evolution (LTE) network, only a single resource is allocated to data transmitted on a physical uplink control channel (PUCCH). As such, employing different time or frequency resources is not available for LTE PUCCH data. Likewise, other systems specify control, traffic, pilot, etc., data with a single resource, negating orthogonal resource transmissions. Thus, improved apparatus and methods for facilitating transmit diversity schemes are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating transmit diversity for communications. According to one aspect, a method for facilitating transmit diversity for communications is provided. The method can comprise processing received content. Further, the method can comprise generating control information in response to the processed content. Additionally, the method can comprise allocating two or more resources associated with two or more transmit antennas for transmitting the control information using a transmit diversity scheme. Moreover, the method can comprise determining cyclic shifts by applying a predetermined cyclic shift delta parameter.

Still another aspect relates to a computer program product comprising a computer-readable medium. The computer-readable medium can include code for causing a computer to process received content. Further, the computer-readable medium can include code for causing the computer to generate control information in response to the processed content. Still further, the computer-readable medium can include code for causing the computer to allocate two or more resources associated with two or more transmit antennas for transmitting the control information using a transmit diversity scheme. Moreover, the computer-readable medium can include code for causing the computer to determine cyclic shifts by applying a predetermined cyclic shift delta parameter.

Yet another aspect relates to an apparatus. The apparatus can include means for processing received content. Further, the apparatus can comprise means for generating control information in response to the processed content. Additionally, the apparatus can comprise means for allocating two or more resources associated with two or more transmit antennas for transmitting the control information using a transmit diversity scheme. Moreover, the apparatus can comprise means for determining cyclic shifts by applying a predetermined cyclic shift delta parameter.

Another aspect relates to an apparatus. The apparatus can include a transmit diversity module operable for: processing received content, generating control information in response to the processed content, allocating two or more resources associated with two or more transmit antennas for transmitting the control information using a transmit diversity scheme, and determining cyclic shifts by applying a predetermined cyclic shift delta parameter.

Furthermore, in accordance with one or more aspects and corresponding disclosure thereof, various aspects are described in connection with receiving communications using a transmit diversity scheme. According to one aspect, a method for receiving communications using a transmit diversity scheme is provided. The method can comprise determining if a wireless communications device (WCD) is capable of transmitting using a transmit diversity scheme. Moreover, the method can comprise processing received control information using the transmit diversity scheme with two or more resources allocated to cyclic shifts determined by applying a predetermined cyclic shift delta parameter upon a determination that the WCD is capable transmitting using a transmit diversity scheme.

Still another aspect relates to a computer program product comprising a computer-readable medium. The computer-readable medium can include code for causing a computer to determine if a wireless communications device (WCD) is capable of transmitting using a transmit diversity scheme. Moreover, the computer-readable medium can include code for causing the computer to process received control information using the transmit diversity scheme with two or more resources allocated to cyclic shifts determined by applying a predetermined cyclic shift delta parameter.

Yet another aspect relates to an apparatus. The apparatus can include means for determining if a wireless communications device (WCD) is capable of transmitting using a transmit diversity scheme. Moreover, the apparatus can comprise means for processing received control information using the transmit diversity scheme with two or more resources allocated to cyclic shifts determined by applying a predetermined cyclic shift delta parameter.

Another aspect relates to an apparatus. The apparatus can include a transmit diversity module operable for: determining if a wireless communications device (WCD) is capable of transmitting using a transmit diversity scheme, and upon a determination that the WCD is capable transmitting using a transmit diversity scheme, processing received control information using the transmit diversity scheme with two or more resources allocated to cyclic shifts determined by applying a predetermined cyclic shift delta parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
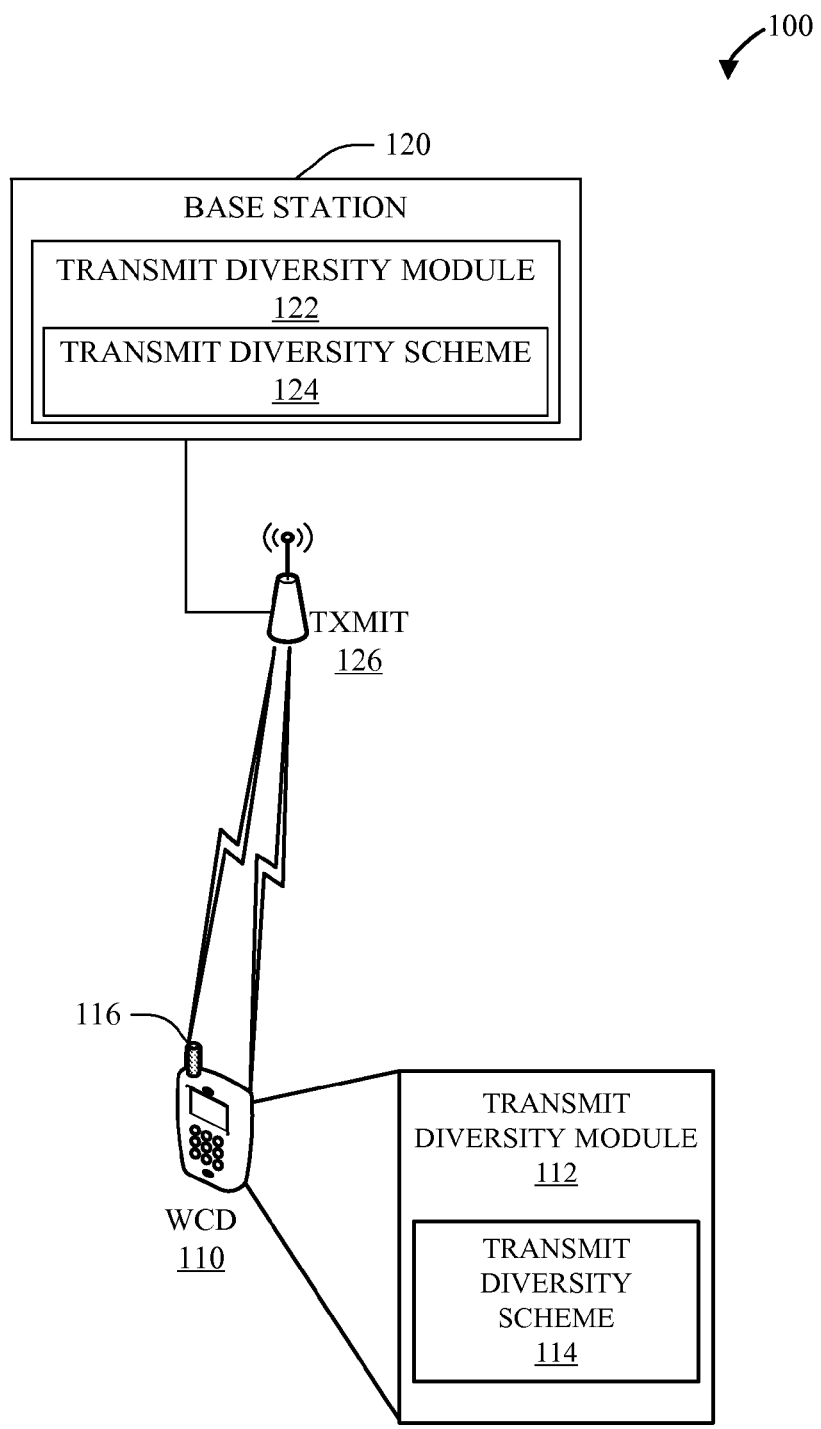
FIG. 1 illustrates a block diagram of a system for facilitating transmit diversity for communications in a wireless communication system according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, during communications between devices, control information may be communicated between devices. For example, acknowledgements (ACKs) are transmitted for successfully received content and negative acknowledgements (NACKs) are transmitted for unsuccessfully received content. As another example, control information may include channel quality indicators (CQI). Further, as an additional example control information may include scheduling requests (SR).

To increase the probability that a communication may be received successfully, transmit diversity may be used. Transmit diversity schemes may provide for multiple sources of substantially similar communications, thereby providing redundancy in the communications. Further, transmit diversity schemes may be implemented through providing multiple resources for the communications. Such multiple resources may be employed in forward link (FL) transmission (e.g., on a downlink channel from a base station to user equipment [UE]), or in reverse link (RL) transmission (e.g., on an uplink channel from the UE to the base station), or both. Various transmit diversity schemes may be used depending at least in part of the control information be transmitted. For example, to communicate ACK/NACKs and/or SR various transmit diversity schemes may be used such as: a virtual transmitter switch transmit diversity (VTSTD) scheme, a cyclic delay diversity (CDD) scheme, a multiple resource diversity scheme, etc. Additionally, to communicate CQI various transmit diversity schemes may be used such as: space time block code (STBC) diversity, a VTSTD scheme, a CDD scheme, a multiple resource transmit diversity scheme, etc.

The above mentioned transmit diversity schemes are now described in more detail for clarification purposes and not as a limitation to the claimed subject matter. A virtual transmitter switch transmit diversity (VTSTD) scheme may employ a change in phase shift between two antennas transmitting in a transmit diversity arrangement. The phase shift can be altered for subsequent time frames of transmitted signals, or groups/fractions of such time frames, where suitable. In addition, the phase shifts can be randomized over time, changed according to some dynamic time-based function, such as a step function (e.g., a 90 degree phase shift each time frame), or the like. A cyclic delay diversity (CDD) scheme may be implemented over a single single-carrier frequency division multiplex (SC-FDM) symbol. The multiplexing capabilities may be reduced because of increased delay spread of the effective composite channel. Further, as another example, a space time block code (STBC) diversity scheme may use multiple antennas to transmit multiple copies of communications.

Employing multiple resources can provide sufficient diversity but multiple resources are not always available for transmit diversity schemes. For instance, some standards only provide a single resource for transmission of data. As one example, in a third generation partnership project (3GPP) long term evolution (LTE) network, only a single resource is allocated to data transmitted on a physical uplink control channel (PUCCH). Thus, employing different time or frequency resources is not available for LTE PUCCH data. Likewise, other systems specify control, traffic, pilot, etc., data with a single resource, negating orthogonal resource transmissions. In such systems, other methods of for transmit diversity can be helpful.

With reference now to FIG. 1, a block diagram of a system 100 for facilitating transmit diversity for communications in a wireless communication system is illustrated. System 100 may include one or more base stations 120 and one or more wireless communications devices (WCD) 110 (e.g terminals), which can communicate via respective antennas 126 and 116. In one aspect, base station 120 may function as an E-NodeB. In one aspect, base station 120 may conduct a downlink (DL) communication to terminal 110 via antennas 126. At the terminal 110, the DL communication may be received via antennas 116. DL communications may provide content to the WCD 110. Received content communicated from base station 120 to terminal 110 may then be analyzed to determine whether such content has successfully been received. In another aspect, terminal 110 may conduct an uplink (UL) communication to base station 120 via antennas 116. At the base station 120, the UL communication may be received via antennas 126. Further, control information may be communicated between the base station 120 and the terminal 110, such as, CQI, SR and/or ACK/NACKs wherein an acknowledgement (ACK) may be transmitted for successfully received content and/or a negative acknowledgement (NACK) may be transmitted for unsuccessfully received content.

In one aspect, WCD 110 may communication control information using a transmit diversity scheme 114 facilitated through transmit diversity module 112. Further, such communicated control information may be received by base station 120 using an agreed upon transmit diversity scheme 124 facilitated through transmit diversity module 122. Additionally, transmit diversity modules (112, 122) may agree upon a transmit diversity scheme, such as but not limited to, multi-resource transmit diversity, VTSTD, CDD, STBC diversity, etc.

In one aspect, transmit diversity modules (112, 122) should further agree upon resource allocation scheduling policy, i.e., the rule to determine the cyclic shift and orthogonal cover to use for control information feedback. A scheduling policy can specify a plurality of resources for a PUCCH channel at a UE. In operation, a WCD 110 and a base station 120 may agree upon one or more resource blocks (RBs) with which to communicate. Once the one or more RBs are determined, transmit diversity modules (112, 122) can generate a plurality of orthogonal resources. A number of the resources can be determined at least in part based on the number of WCDs served by the system, prevailing channel conditions, level of interference in the system, multipath scattering, or the like, or a combination thereof. To control a number of resources, transmit diversity modules (112, 122) can assign appropriate cyclic shift delta parameter, which determines the minimum time domain separation among different resources with different cyclic shifts Since one resource corresponds to one cyclic shift plus one orthogonal cover, a total number of available resources for transmit diversity, in such a manner, may determined by $\text{Number}_{Cyclic\ Shift} \times \text{Number}_{Orthogonal\ Cover\ Allocation}$. Thus, for instance, where 12 cyclic shifts are available, and 3 orthogonal cover allocations, a total of 36 resources can be utilized in the system. To implement transmit diversity, at least two such resources (or, e.g., more for larger multi-antenna transmissions) can be assigned to each WCD served in the system.

Figure 2:
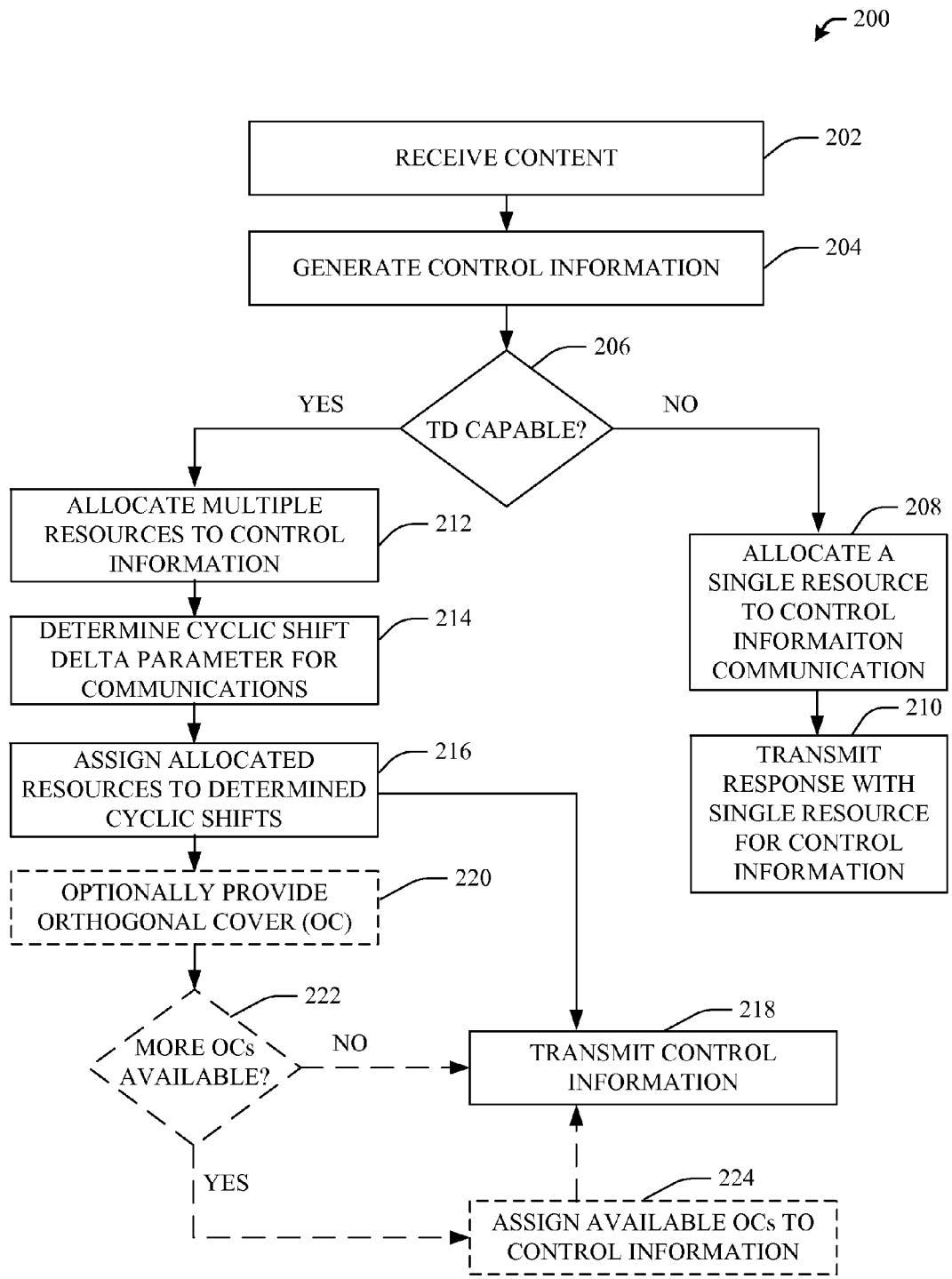
FIG. 2 depicts an exemplary flow diagram of a methodology for facilitating transmit diversity for communications according to an aspect.

FIG. 2 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 2, exemplary method 200 for facilitating transmit diversity for communications is illustrated. Generally, at reference numeral 202, content is received by a wireless communications device (WCD). In one aspect, the content may be received from a base station, another WCD or the like. At reference numeral 204, the received content may be processed to generate control information, such as ACK/NACKs, CQI, SR, etc., where acknowledgements (ACKs) are generated for successfully received content and negative acknowledgements (NACKs) are generated for unsuccessfully received content. In one aspect, the control information may be formatted using: a long term evolution (LTE) physical uplink control channel (PUCCH) format 0, 1, 1a, or 1b, a LTE enhanced PUCCH format 1, wherein the enhanced PUCCH format 1 includes additional resources used for control information, a LTE PUCCH format 2, etc. In another aspect, the generating may further comprise formatting the control information using: a 1-bit binary phase shift key (BPSK) format, a 2-bit quadrature phase shift key (QPSK) format, a 16-bit quadrature amplitude modulation (QAM) format, a 64-bit QAM format, etc.

At reference numeral 206, it is determined whether the WCD is capable of communicating using a transmit diversity scheme. If at reference numeral 206, it is determine the WCD is not capable of communicating using a transmit diversity scheme, then at reference numeral 208, a single resource may be allocated for the control information communication, and at reference numeral 210, the single resource response may be transmitted. In one aspect, the transmitted response may be transmitted to a base station, another WCD, or the like.

By contrast, if at reference numeral 206, it is determined that the WCD is capable of communicating using a transmit diversity scheme, then at reference numeral 212 an agreed upon transmit diversity scheme may be implemented and in one aspect multiple resources may be allocated for communicating the generated response. In one aspect, a base station selects the transmit diversity scheme to use prior to communications with the WCD. In another aspect, the WCD may select from possible transmit diversity schemes with which the base station is compatible.

At reference numeral 214, cyclic shift delta parameters may be used to determine a number of cyclic shifts that may be used in a response. As the value used for a cyclic shift delta parameter decreases, the number of available resources may increase. Based on needs of a communications system 100, cyclic shift delta parameter can be chosen to generate cyclic shifts with larger or shorter shifts. At reference numeral 214, control information may be assigned to the determined cyclic shifts.

Once the transmit diversity scheme has been agreed upon and the cyclic shifts to be used may be determined by the cyclic shift delta parameter, the WCD may transmit the response communications at reference numeral 218. The transmitted response may include, for instance, a plurality of distinct resources possibly characterized by different time domain orthogonal covers, as described herein. In one particular example in the context of LTE with extended cyclic prefix, the additional distinct resources for communication on control information using a transmit diversity scheme, such as for PUCCH format 1/1a/1b with the same cyclic shifts, can be generated by employing the following time domain orthogonal covers over the 4 data SC-FDM symbols in a slot: ++-- and +-+-, which are not used in the LTE release 8 specification.

Additionally and/or optionally, at reference numeral 220, orthogonal covers may be applied to the response communications. The orthogonal cover allocations can employ multiple instances of a spreading sequence that are repeated across time resources of a wireless signal. In one aspect, orthogonal covers (OCs), typically utilized for multiplexing multiple WCDs on common resources, can be implemented for the multiple transmitters of the transmit diversity arrangement. In such an aspect, at reference numeral 222, it is determined whether any OCs may be available but are currently unused. For example, where a system employs only a portion of permissible OCs (e.g., based on limitations for pilot or data symbols on a particular channel), the available OCs, may be employed for transmit diversity purposes. If, at reference numeral 222, it is determined that no additional OCs are available, then the response may be transmitted at reference numeral 218.

By contrast, if at reference numeral 222, it is determined that additional OCs may be available, then at reference numeral 224, the additional OCs may be used to provide additional resources for transmission of control information, such as ACK/NACKs, CQI, SR, etc.

Figure 3A:
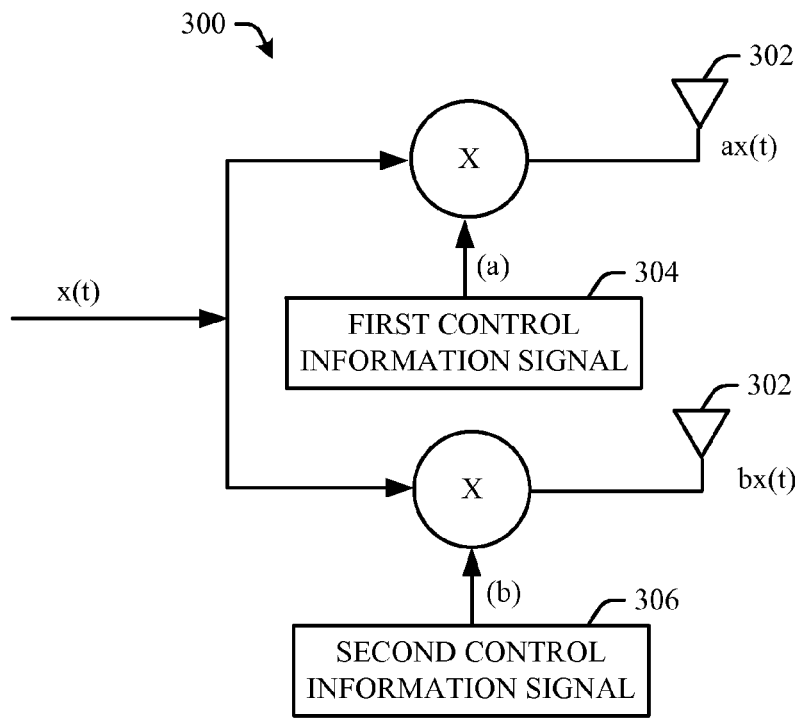
FIG. 3A depicts an exemplary transmit diversity structure according to an aspect.
Figure 3B:
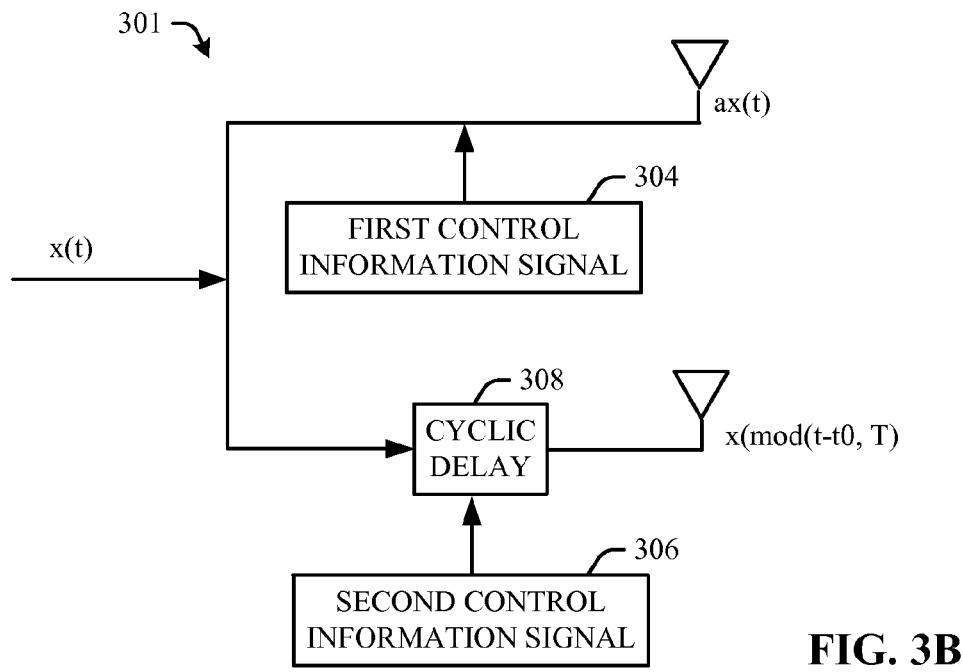
FIG. 3B depicts an exemplary transmit diversity structure according to another aspect.

With reference now to FIGS. 3A and 3B, exemplary structures to facilitate various transmit diversity schemes are illustrated. As discussed briefly above, various transmit diversity schemes may be implemented for communication of control information. Turning now to FIG. 3A, a virtual transmit antenna structure 300 is depicted. In one aspect of the structure, multiple transmit antennas 302 may be used to transmit multiple instances of control information (304, 306) in a transmit diversity scheme. In such an aspect, a precoding vector (e.g. [a,b]) may hope randomly from slot to slot in determining which antenna may be used for communications. In one such aspect, the multiple antennas may be virtual antennas. In another aspect, the multiple instances of control information (304, 306) may be encoded over a single SC-FDM symbol. As such, multiplexing capabilities of the system may be unchanged from a non-transmit diversity enabled scheme. In one aspect, virtual transmit antenna structure 300 may be applicable for LTE Release 8 formats 1, 1a, 1b, 2, 2a and 2b.

Turning now to FIG. 3B, a cyclic delay diversity structure 301 is depicted. Similarly to the above described transmit diversity scheme the multiple instances of control information (304, 306) may be encoded over a single SC-FDM symbol. But, unlike the virtual transmit antenna structure 300, a cyclic delay 308 module is used to delay communication of the second instance of the control information 306. For example, assuming a first instance may be transmitted at a time (t), the second instance may be transmitted at a later time as a function of the cyclic delay (e.g. mod(t-t0,T)). As such, the multiplexing capability may be reduced because of increased channel delay spread. In one aspect, use of a transmit diversity scheme with cyclic delay diversity may be enabled by changing a cyclic shift delta parameter in LTE Release 8. Further, in one aspect, cyclic delay diversity structure 301 may be applicable for LTE Release 8 formats 1, 1a, 1b, 2, 2a and 2b.

Figure 4:
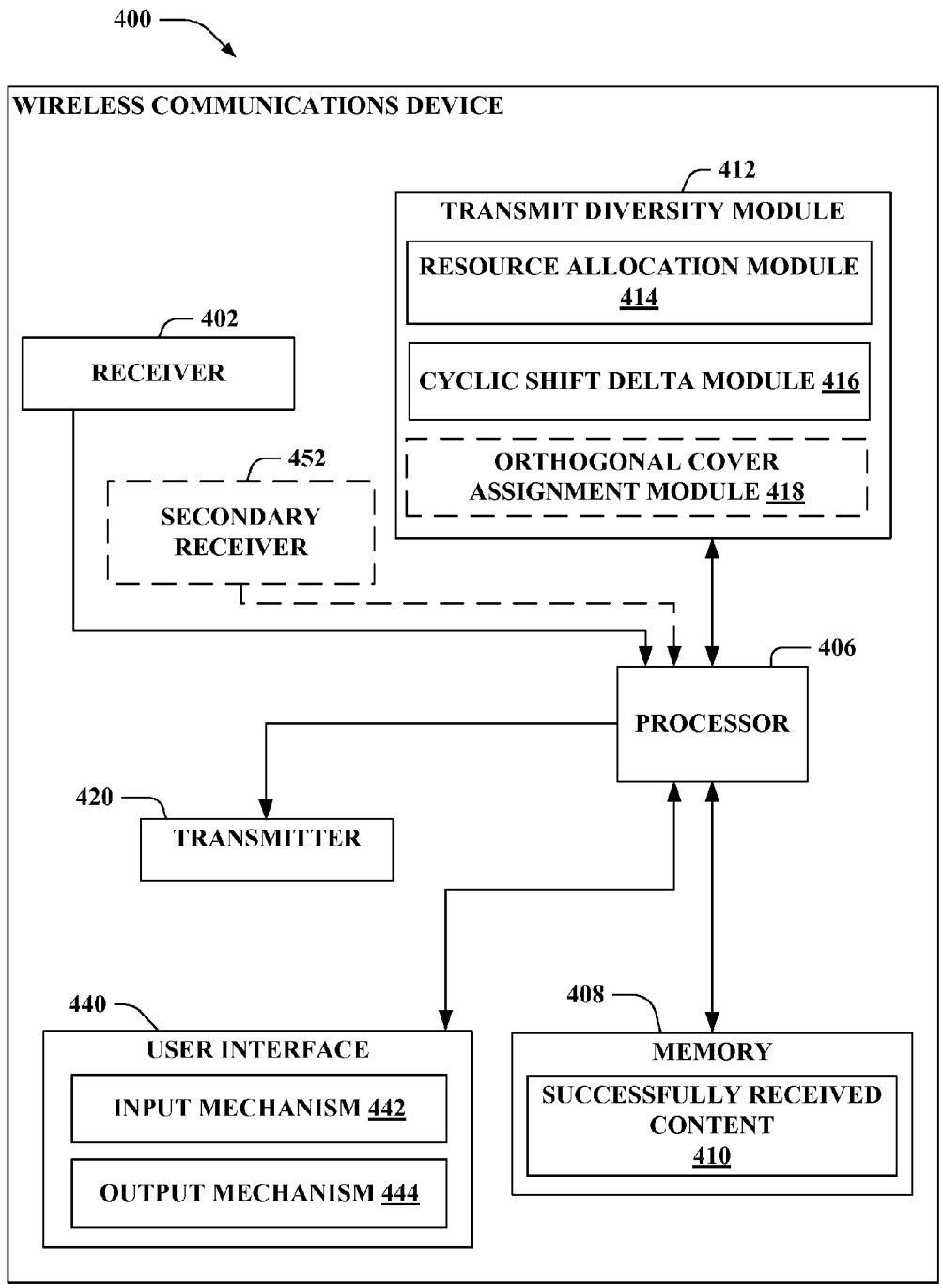
FIG. 4 depicts a block diagram of an exemplary wireless communications device that can for facilitate transmit diversity for communications according to an aspect.

With reference now to FIG. 4, an illustration of a wireless communications device (WCD) 400 (e.g. a client device) that can facilitate transmit diversity for communications is presented. WCD 400 comprises receiver 402 that receives one or more signal from, for instance, one or more receive antennas (not shown), performs typical actions on (e.g., filters, amplifies, downconverts, etc.) the received signal, and digitizes the conditioned signal to obtain samples. Receiver 402 can further comprise an oscillator that can provide a carrier frequency for demodulation of the received signal and a demodulator that can demodulate received symbols and provide them to processor 406 for channel estimation. In one aspect, client device 400 may further comprise secondary receiver 452 and may receive additional channels of information.

Processor 406 can be a processor dedicated to analyzing information received by receiver 402 and/or generating information for transmission by one or more transmitters 420 (for ease of illustration, only one transmitter is shown), a processor that controls one or more components of WCD 400, and/or a processor that both analyzes information received by receiver 402 and/or receiver 452, generates information for transmission by transmitter 420 for transmission on one or more transmitting antennas (not shown), and controls one or more components of WCD 400.

WCD 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. Memory 408 can additionally store protocols and/or algorithms associated with estimating and/or utilizing a channel (e.g., performance based, capacity based, etc.). In one aspect, memory may include successfully received content 410. In such an aspect, successfully received content 410 may include a portion and/or all of content transmitted from a base station, other WCD, or the like.

It will be appreciated that the data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 408 of the subject systems and methods is intended to comprise, without being limited to, these and any other suitable types of memory.

WCD 400 can further comprise transmit diversity module 412 that facilitates transmit diversity for communications from the WCD 400. In one aspect, information transmitted through a transmit diversity scheme may be in response to content received from a base station, another WCD, or the like. Transmit diversity module 412 may further include resource allocation module 414, and cyclic shift delta module 416 and may be operable to communicate facilitate communication with one or more base stations and/or one or more other WCDs using predetermined transmit diversity schemes. Additionally, in one aspect, transmit diversity module 412 may include orthogonal cover assignment module 418. Moreover, in one aspect, processor 406 may provide the means to enable transmit diversity module 412 to process received content, generate control information in response to the processed content, allocate two or more resources associated with two or more transmit antennas for transmitting the control information using a transmit diversity scheme, determine a cyclic shift delta parameter to the allocated resources, and assign control information to the determined allocated resources.

In one aspect, resource allocation module 414 may be operable to allocate multiple resources to control information to be transmitted using a transmit diversity scheme. In one aspect, a base station may select the transmit diversity scheme to use prior to communications with WCD 400. In another aspect, the WCD may select from possible transmit diversity schemes with which the base station is compatible.

In another aspect, cyclic shift delta parameter module 416 may be operable for determining a number of available cyclic shifts for the allocated resources. As such, as the value used for a cyclic shift delta parameter decreases, the number of available resources may increase. On the other hand, to increase signal diversity, a large cyclic shift delta parameter may be selected, such as multiple bits of the spreading function. Thus, based on needs of a communications system, cyclic shift delta parameter can generate a greater or small number of cyclic shifts.

In a further aspect, orthogonal cover (OCs) assignment module 418 may be operable to determine if additional unused OCs are available for resource transmissions. The orthogonal cover allocations can employ multiple instances of a spreading sequence that are repeated across time resources of a wireless signal. In one aspect, orthogonal covers (OCs), typically utilized for multiplexing multiple WCDs on common resources, can be implemented for the multiple transmitters of the transmit diversity arrangement.

For example, for communications using a LTE PUCCH format 1a/1b, 6 cyclic shifts (CSs) may be available. In the described example, assume three SC-FDM symbols are used for control information (e.g. ACK/NACKs) and four SC-FDM symbols are used for reference signal. As such, 6 cyclic shifts times 3 possible orthogonal covers over the 3 reference symbols equals 18 available orthogonal resources for reference signal multiplexing. By contrast, 6 cyclic shifts times 4 orthogonal covers over 4 data SC-FDM symbols equals 24 total orthogonal resources for ACK/NACK multiplexing. In certain aspects, only 18 resources are available for ACK/NACK multiplexing in part due to the limits associated with the 18 available resources for reference signal. Therefore, in such aspects 24 less 18 leaves 6 orthogonal resources left unused in current Rel-8 LTE specification, which may be available for control information communications in an LTE-advanced specification.

Additionally, client device 400 may include user interface 440. User interface 440 may include input mechanisms 442 for generating inputs into WCD 400, and output mechanism 442 for generating information for consumption by the user of wireless device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, output mechanism 444 may include a display operable to present content that is in image or video format or an audio speaker to present content that is in an audio format.

Figure 5:
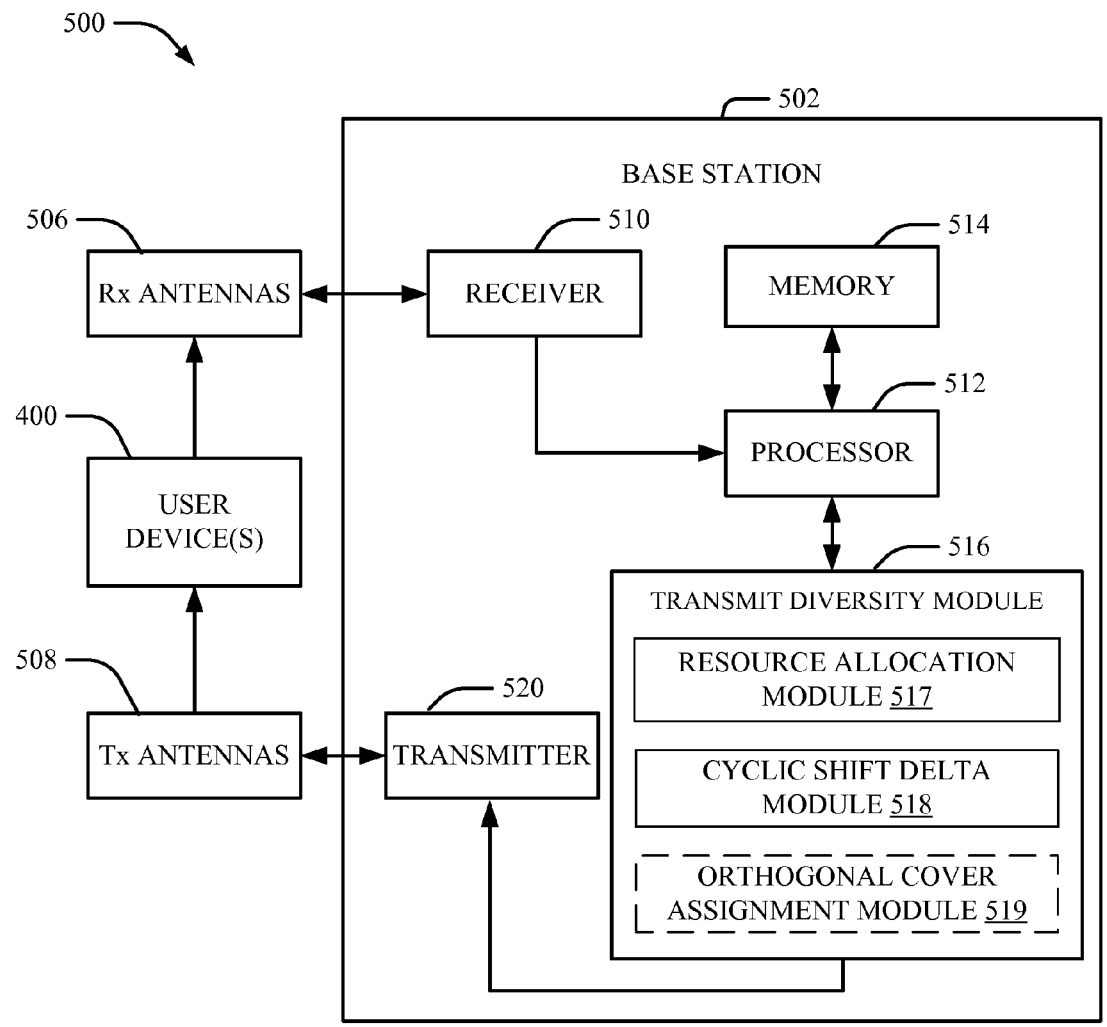
FIG. 5 is a block diagram depicting the architecture of a base station configured to receive communications using a transmit diversity scheme, according to another aspect herein described.

With reference to FIG. 5, an example system 500 that comprises a base station 502 with a receiver 510 that receives signal(s) from one or more user devices 400 through a plurality of receive antennas 506, and a transmitter 520 that transmits to the one or more user devices 400 through a plurality of transmit antennas 508. Receiver 510 can receive information from receive antennas 506. Symbols may be analyzed by a processor 512 that is similar to the processor described above, and which is coupled to a memory 514 that stores information related to data processing. Processor 512 is further coupled to a transmit diversity module 516 that facilitates receiving communications associated with one or more respective user devices 400 using a transmit diversity scheme. Signals may be multiplexed and/or prepared for transmission by a transmitter 520 through one or more transmit antennas 508 to user devices 400.

In one aspect, transmit diversity module 516 may include resource allocation module 517, and cyclic shift module 518 and may be operable to communicate with one or more WCDs 400 using predetermined transmit diversity schemes. Additionally, in one aspect, transmit diversity module 516 may include orthogonal cover assignment module 519. Moreover, in one aspect of system 500, processor 512 provides the means for enabling transmit diversity module 516 to determine if a wireless communications device (WCD) is capable of transmitting using a transmit diversity scheme and process received control information using the transmit diversity scheme, a predetermined resource allocation, and a predetermined cyclic shift delta parameter, upon a determination that the WCD is capable transmitting using a transmit diversity scheme.

In one aspect, resource allocation module 517 may be operable to determine which multiple resources may be used for implementing the transmit diversity scheme with a WCD 400. In one aspect, base station 502 may select the transmit diversity scheme to use prior to communications with WCD 400. In another aspect, the WCD may select from possible transmit diversity schemes with which the base station is compatible.

In another aspect, cyclic prefix delta assignment parameter module 518 may be operable for processing the resources as applied to the determined the number of cyclic shifts that may be available for communications. As such, as the value used for a cyclic shift delta parameter decreases, the number of available resources may increase. On the other hand, to increase signal diversity, a large cyclic shift delta parameter may be selected, such as multiple bits of the spreading function. Thus, based on needs of a communications system, cyclic shift delta parameter can generate a greater or small number of cyclic shifts.

In a further aspect, orthogonal cover (OCs) assignment module 519 may be operable to determine if additional unused OCs may be used for resource transmissions. The orthogonal cover allocations can employ multiple instances of a spreading sequence that are repeated across time resources of a wireless signal. In one aspect, orthogonal covers (OCs), typically utilized for multiplexing multiple WCDs on common resources, can be implemented for the multiple transmitters of the transmit diversity arrangement.

Figure 6:
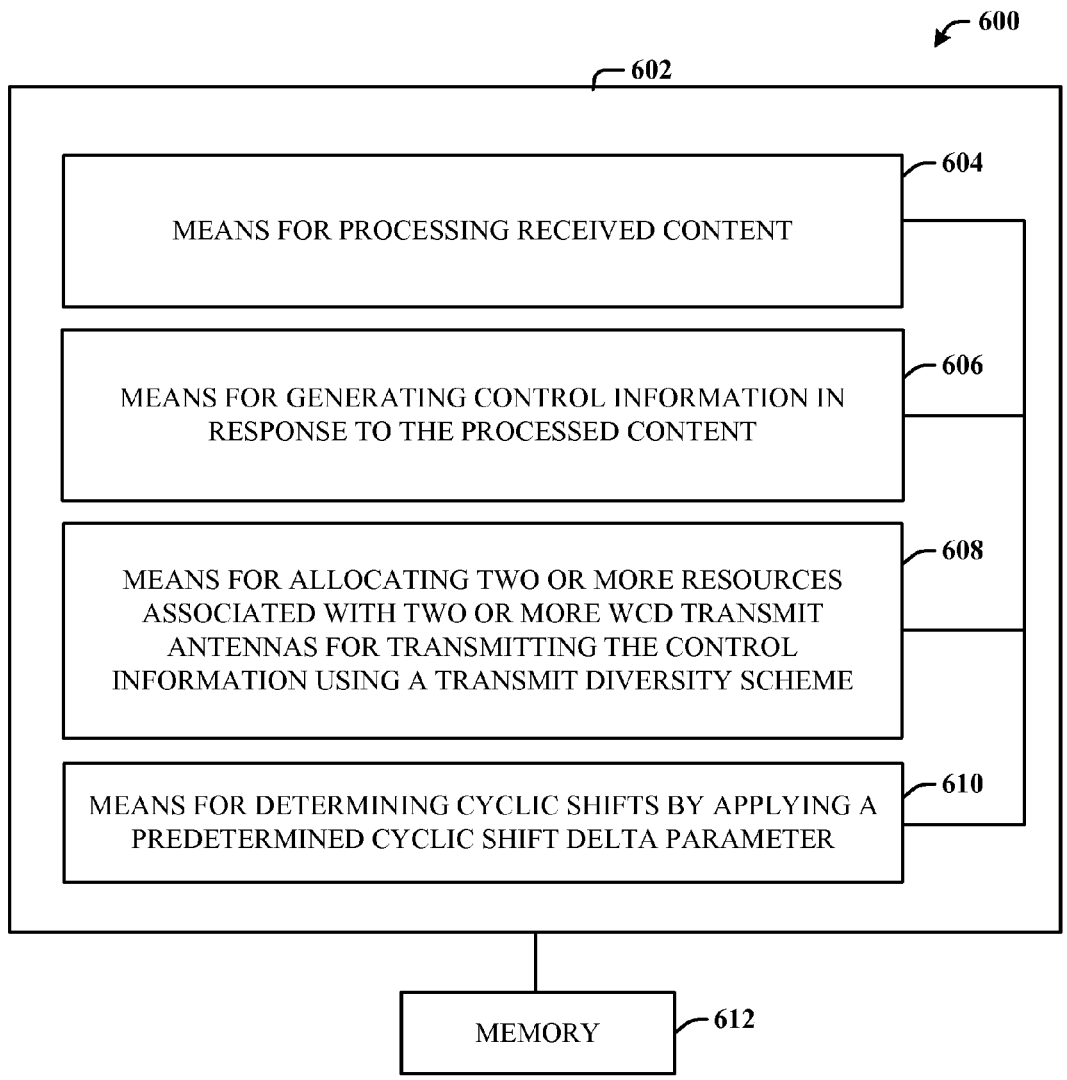
FIG. 6 depicts a block diagram of an exemplary communication system that can for facilitate transmit diversity for communications according to an aspect.

With reference to FIG. 6, a block diagram of an exemplary system 600 that can facilitate transmit diversity for communications is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for processing received content 604. Further, logical grouping 602 can comprise means for generating control information in response to the processed content 606. In one aspect, the control information may include one or more hybrid automatic repeat request (HARM) acknowledgments or negative acknowledgments (ACK/NACKs), channel quality indicators (CQI), scheduling requests (SR). In such an aspect, the control information may be formatted using: a long term evolution (LTE) physical uplink control channel (PUCCH) format 0, 1, 1a, or 1b, a LTE enhanced PUCCH format 1, wherein the enhanced PUCCH format 1 includes additional bits used for control information, a LTE PUCCH format 2, etc. In another aspect, the generating may further comprise formatting the control information using: a 1-bit binary phase shift key (BPSK) format, a 2-bit quadrature phase shift key (QPSK) format, a 16-bit Quadrature amplitude modulation (QAM) format, a 64-bit QAM format, etc.

Still further, logical grouping 602 can comprise means for allocating two or more resources associated with two or more transmit antennas for transmitting the control information using a transmit diversity scheme 608. In one aspect, the transmitting may further comprise transmitting using: a Physical Uplink Control Channel (PUCCH), a Physical Uplink Shared Channel (PUSCH), etc. In another aspect, the transmit diversity scheme includes: a multiple resource transmit diversity scheme, a cyclic delay diversity scheme, a virtual transmitter switched transmit diversity scheme, a space time block code transmit diversity scheme, etc. In still another aspect, the two or more transmit antennas may be selected through at least one of: selecting the two or more transmit antennas corresponding to two or more WCD receiving antennas used for receiving the content from the base station, or selecting the two or more transmit antennas based on a predetermined configuration known to the WCD and the base station. Yet further, logical grouping 602 can comprise means for determining cyclic shifts by applying a predetermined cyclic shift delta parameter 610.

Additionally, system 600 can include a memory 612 that retains instructions for executing functions associated with the means 604, 606, 608 and 610. While shown as being external to memory 612, it is to be understood that one or more of the means 604, 606, 608, 610 can exist within memory 612.

Figure 7:
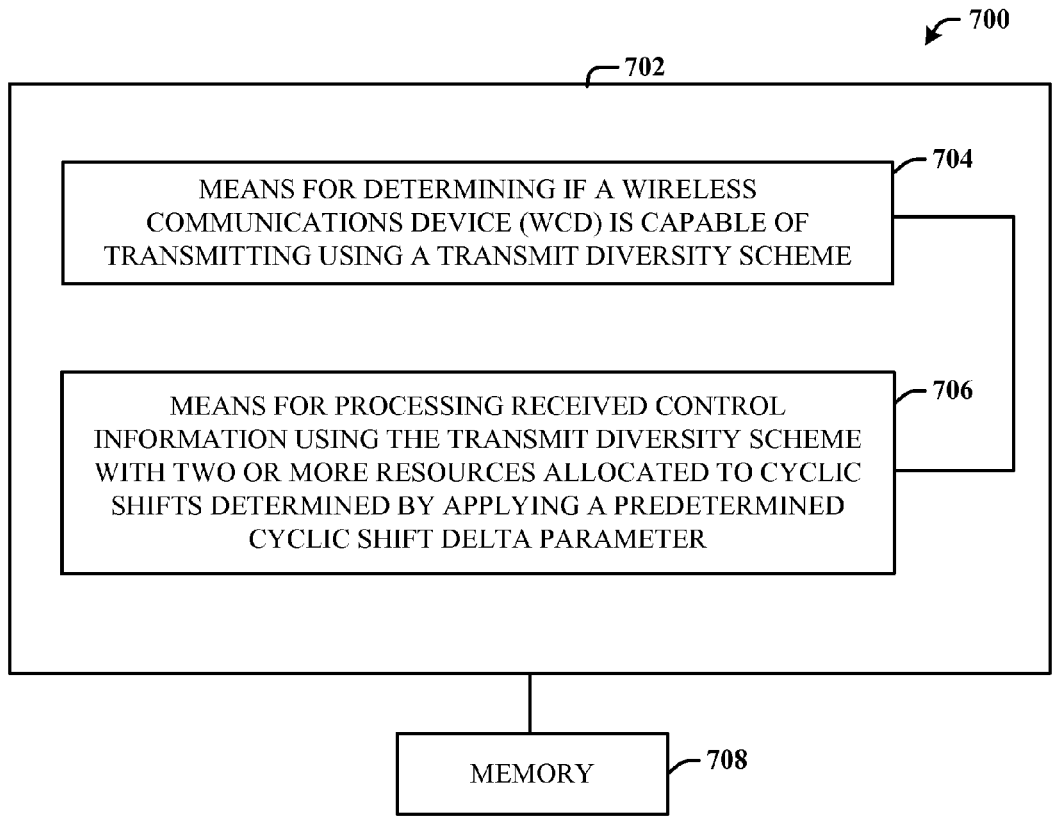
FIG. 7 depicts a block diagram of an exemplary communication system that receive communications using a transmit diversity scheme according to an aspect.

With reference to FIG. 7, a block diagram of an exemplary system 700 that can process reduced overhead HARQ communications is illustrated. For example, system 700 can reside at least partially within a base station, E-NodeB, etc. According to another example aspect, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include means for determining if a wireless communications device (WCD) is capable of transmitting using a transmit diversity scheme 704. In another aspect, the transmit diversity scheme includes: a multiple resource transmit diversity scheme, a cyclic delay diversity scheme, a virtual transmitter switched transmit diversity scheme, a space time block code transmit diversity scheme, etc.

Further, logical grouping 702 can comprise means for processing received control information using the transmit diversity scheme, two or more resources allocated to cyclic shifts determined by applying a predetermined cyclic shift delta parameter 706. In one aspect, the control information may be received using: a Physical Uplink Control Channel (PUCCH), a Physical Uplink Shared Channel (PUSCH), etc. In another aspect, the control information may include one or more hybrid automatic repeat request (HARM) acknowledgments or negative acknowledgments (ACK/NACKs). In such an aspect, the control information may be formatted using: a long term evolution (LTE) physical uplink control channel (PUCCH) format 0, 1, 1a, or 1b, a LTE enhanced PUCCH format 1, wherein the enhanced PUCCH format 1 includes additional bits used for control information, a LTE PUCCH format 2, etc. In still another aspect, the generating may further comprise generating the control information uses: a 1-bit binary phase shift key (BPSK) format, a 2-bit quadrature phase shift key (QPSK) format, a 16-bit Quadrature amplitude modulation (QAM) format, a 64-bit QAM format, etc.

Additionally, system 700 can include a memory 708 that retains instructions for executing functions associated with the means 704 and 706. While shown as being external to memory 708, it is to be understood that one or more of the means 704 and 706 can exist within memory 708.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of facilitating transmit diversity for communications, the method comprising:
   processing received content;
   generating control information in response to the processed content;
   allocating two or more resources associated with two or more transmit antennas for transmitting the control information using a transmit diversity scheme;
   determining cyclic shifts by applying a predetermined cyclic shift delta parameter;
   assigning a first orthogonal cover (OC) for a first allocated resource and
   assigning a second OC for a second allocated resource when at least one unallocated OC is available, the at least one unallocated OC being determined based at least in part on a number of available cyclic shifts, a number of available OCs, a number of reference signal symbols, and a number of resources available for a reference signal.

2. The method of claim 1, further comprising:
receiving the content from a device configured to process the control information using the transmit diversity scheme; and
transmitting the control information using the allocated resources and determined cyclic shifts to the device using the transmit diversity scheme.

3. The method of claim 1, wherein the control information includes one or more channel quality indicators (CQI); scheduling requests (SR); acknowledgments (ACK) or negative acknowledgments (NACKs); or a combination thereof.

4. The method of claim 1, wherein the control information is formatted using one or more of:
a long term evolution (LTE) physical uplink control channel (PUCCH) allocation using 1 or 2 bits;
a LTE PUCCH allocation using greater than 2 bits;
a LTE PUCCH format 2,
or a combination thereof, wherein the LTE PUCCH format 2 includes an allocation of a plurality of bits and is used to communication channel quality information (CQI) if the LTE PUCCH format 2 is not used to communicate at least one acknowledgment (ACK) or negative acknowledgement (NACK).

5. The method of claim 2, wherein the transmitting further comprises transmitting using one or more of a Physical Uplink Control Channel (PUCCH), a Physical Uplink Shared Channel (PUSCH), or a combination thereof.

6. The method of claim 1, wherein the transmit diversity scheme includes one or more of a multiple resource allocation transmit diversity scheme; a cyclic delay diversity (CDD) scheme; a virtual transmitter switched transmit diversity (VTSTD) scheme; a space time block code (STBC) transmit diversity scheme, or a combination thereof.

7. The method of claim 1, in which the first allocated resource and the second allocated resource are located within a same slot.

8. A computer program product, comprising:
a non-transitory computer-readable medium having program code recorded thereon, the program code comprising:
program code to process received content;
program code to generate control information in response to the processed content;
program code to allocate two or more resources associated with two or more transmit antennas for transmitting the control information using a transmit diversity scheme;
program code to determine cyclic shifts by applying a predetermined cyclic shift delta parameter;
program code to assign a first orthogonal cover (OC) for a first allocated resource; and
program code to assign a second OC for a second allocated resource when at least one unallocated OC is available, the at least one unallocated OC being determined based at least in part on a number of available cyclic shifts, a number of available OCs, a number of reference signal symbols, and a number of resources available for a reference signal.

9. The computer program product of claim 8, wherein the control information includes one or more channel quality indicators (CQI); scheduling requests (SR); acknowledgments (ACK) or negative acknowledgments (NACKs); or a combination thereof.

10. The computer program product of claim 8, wherein the control information is formatted using one or more of:
a long term evolution (LTE) physical uplink control channel (PUCCH) allocation using 1 or 2 bits;
a LTE PUCCH allocation using greater than 2 bits;
a LTE PUCCH format 2,
or a combination thereof, wherein the LTE PUCCH format 2 includes an allocation of a plurality of bits and is used to communication channel quality information (CQI) if the LTE PUCCH format 2 is not used to communicate at least one acknowledgment (ACK) or negative acknowledgement (NACK).

11. The computer program product of claim 8, wherein the transmit diversity scheme includes one or more of a multiple resource allocation transmit diversity scheme; a cyclic delay diversity (CDD) scheme; a virtual transmitter switched transmit diversity (VTSTD) scheme; a space time block code (STBC) transmit diversity scheme, or a combination thereof.

12. An apparatus, comprising:
means for processing received content;
means for generating control information in response to the processed content;
means for allocating two or more resources associated with two or more transmit antennas for transmitting the control information using a transmit diversity scheme;
means for determining cyclic shifts by applying a predetermined cyclic shift delta parameter;
means for assigning a first orthogonal cover (OC) for a first allocated resource; and
means for assigning a second OC for a second allocated resource when at least one unallocated OC is available, the at least one unallocated OC being determined based at least in part on a number of available cyclic shifts, a number of available OCs, a number of reference signal symbols, and a number of resources available for a reference signal.

13. The apparatus of claim 12, further comprising:
means for receiving the content from a device configured to process the control information using the transmit diversity scheme; and
means for transmitting the control information using the allocated resources and determined cyclic shifts to the device using the transmit diversity scheme.

14. The apparatus of claim 12, wherein the control information includes one or more channel quality indicators (CQI); scheduling requests (SR); acknowledgments (ACK) or negative acknowledgments (NACKs); or a combination thereof.

15. The apparatus of claim 12, wherein the control information is formatted using one or more of:
a long term evolution (LTE) physical uplink control channel (PUCCH) allocation using 1 or 2 bits;
a LTE PUCCH allocation using greater than 2 bits;
a LTE PUCCH format 2,
or a combination thereof, wherein the LTE PUCCH format 2 includes an allocation of a plurality of bits and is used to communication channel quality information (CQI) if the LTE PUCCH format 2 is not used to communicate at least one acknowledgment (ACK) or negative acknowledgement (NACK).

16. The apparatus of claim 13, wherein the means for transmitting further comprises means for transmitting using one or more of a Physical Uplink Control Channel (PUCCH), a Physical Uplink Shared Channel (PUSCH), or a combination thereof.

17. The apparatus of claim 12, wherein the transmit diversity scheme includes one or more of a multiple resource allocation transmit diversity scheme; a cyclic delay diversity (CDD) scheme; a virtual transmitter switched transmit diversity (VTSTD) scheme; a space time block code (STBC) transmit diversity scheme, or a combination thereof.

18. A wireless communications device (WCD), comprising:
    at least one processor configured for:
        processing received content;
        generating control information in response to the processed content;
        allocating two or more resources associated with two or more transmit antennas for transmitting the control information using a transmit diversity scheme;
        determining cyclic shifts by applying a predetermined cyclic shift delta parameter;
        assigning a first orthogonal cover (OC) for a first allocated resource; and
        assigning a second OC for a second allocated resource when at least one unallocated OC is available, the at least one unallocated OC being determined based at least in part on a number of available cyclic shifts, a number of available OCs, a number of reference signal symbols, and a number of resources available for a reference signal.

19. The WCD of claim 18, in which the at least one processor is further configured for:
    receiving the content from a device; and
    transmitting the control information using the allocated resources and determined cyclic shifts to the device using the transmit diversity scheme.

20. The WCD of claim 18, wherein the control information includes one or more channel quality indicators (CQI); scheduling requests (SR); acknowledgments (ACK) or negative acknowledgments (NACKs); or a combination thereof.

21. The WCD of claim 18, wherein the control information is formatted using one or more of:
    a long term evolution (LTE) physical uplink control channel (PUCCH) allocation using 1 or 2 bits;
    a LTE PUCCH allocation using greater than 2 bits;
    a LTE PUCCH format 2,
or a combination thereof, wherein the LTE PUCCH format 2 includes an allocation of a plurality of bits and is used to communication channel quality information (CQI) if the LTE PUCCH format 2 is not used to communicate at least one acknowledgment (ACK) or negative acknowledgement (NACK).

22. The WCD of claim 19, wherein the transceiver is further operable for transmitting using one or more of a Physical Uplink Control Channel (PUCCH), a Physical Uplink Shared Channel (PUSCH), or a combination thereof.

23. The WCD of claim 18, wherein the transmit diversity scheme includes one or more of a multiple resource allocation transmit diversity scheme; a cyclic delay diversity (CDD) scheme; a virtual transmitter switched transmit diversity (VTSTD) scheme; a space time block code (STBC) transmit diversity scheme, or a combination thereof.

\* \* \* \* \*